Sept. 22, 1959 K. M. GERTEIS 2,905,094
AUTOMATICALLY REVERSIBLE POSITIVE DISPLACEMENT
INTERNAL GEAR ROTARY PUMP
Filed June 1, 1955 2 Sheets-Sheet 2
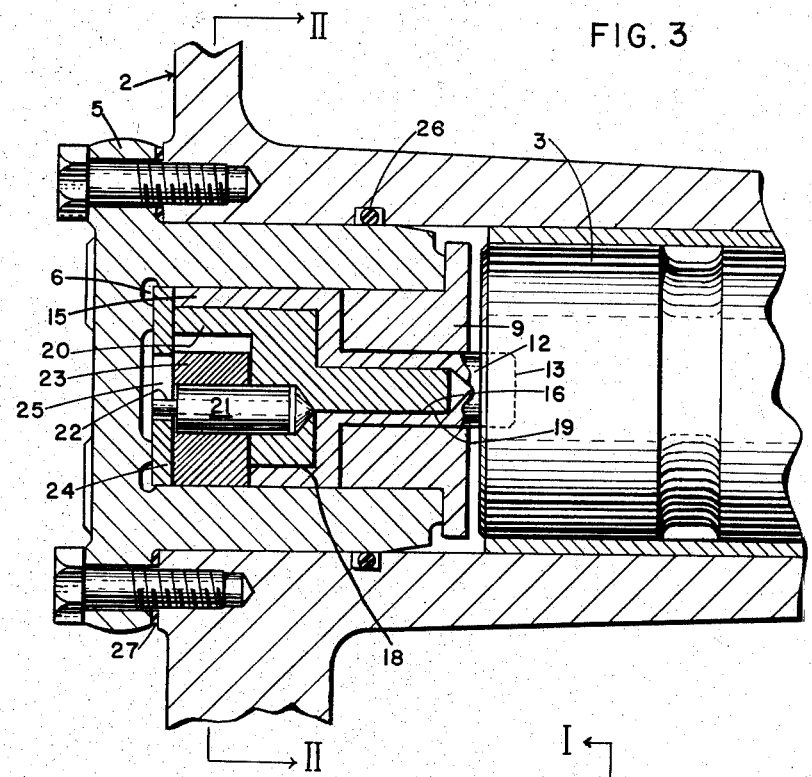
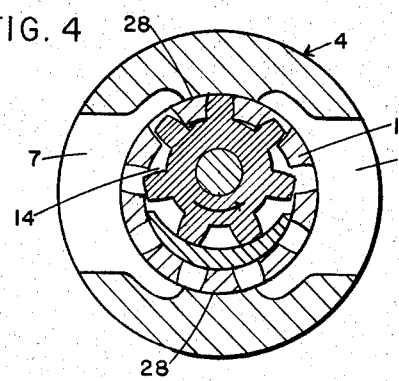
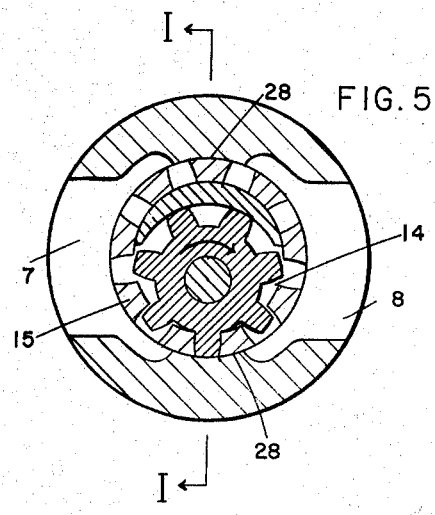
INVENTOR.
KARL M. GERTEIS
BY
*Herman Seid*
ATTORNEY United States Patent Office 2,905,094
Patented Sept. 22, 1959

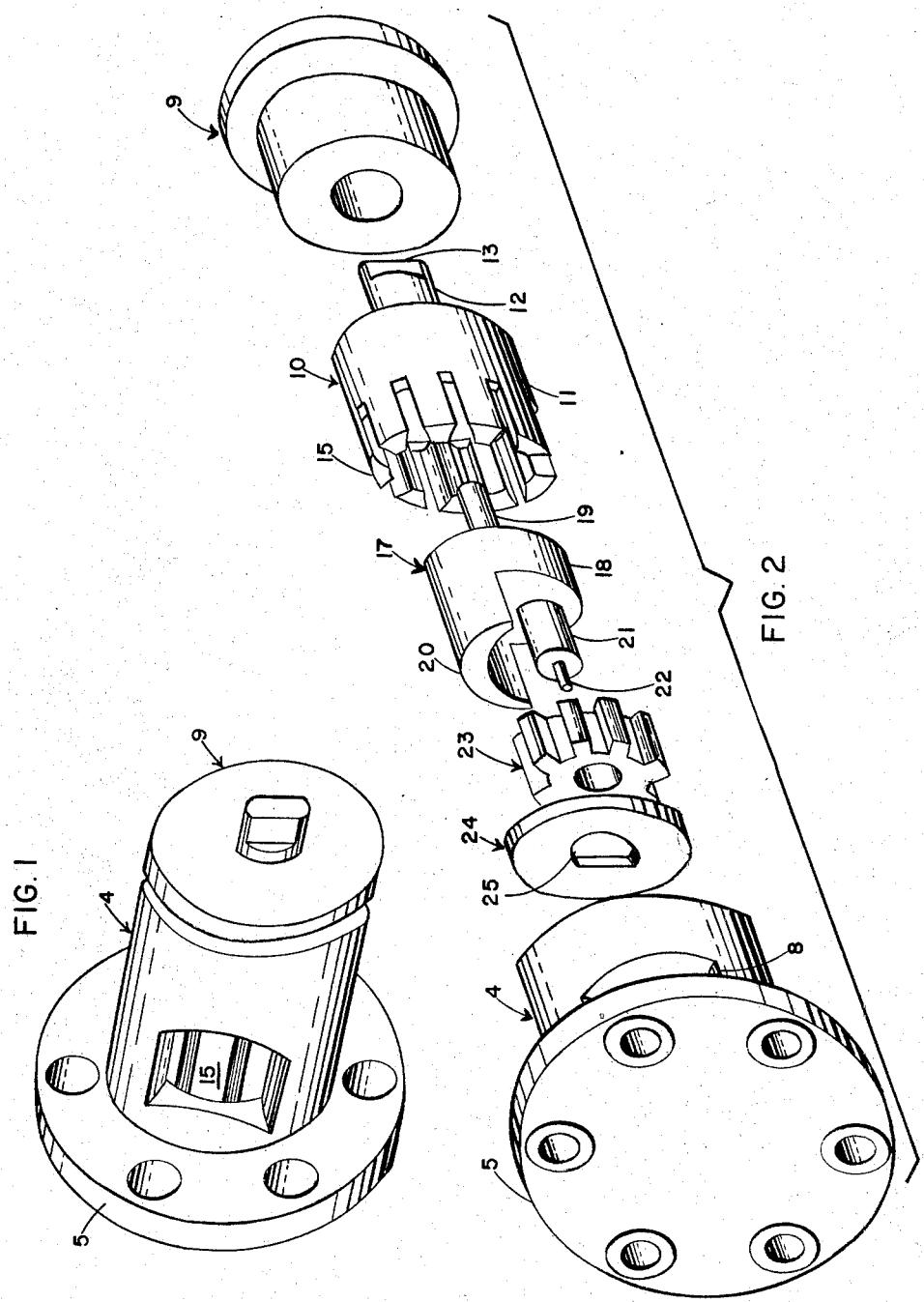

2,905,094

AUTOMATICALLY REVERSIBLE POSITIVE DISPLACEMENT INTERNAL GEAR ROTARY PUMP

Karl M. Gerteis, Syracuse, N.Y., assignor to Carrier Corporation, Syracuse, N.Y., a corporation of Delaware Application June 1, 1955, Serial No. 512,437

9 Claims. (Cl. 103—117)

This invention relates generally to positive displacement pumps, and more particularly to automatically reversible, positive displacement internal gear rotary pumps.

Pumps of this type are generally used for lubrication systems in pumps, compressors and engines. These pumps usually consist of an assembly including a driving rotor hereinafter called a rotor, having an internal gear at one end thereof, and a smaller idler gear, eccentrically mounted with respect to the rotor on a rotatable idler gear carrier, adapted to mesh with the teeth on the gear formed on the rotor. The idler gear carrier is provided with a crescent shaped wall, the inner surface of which is in sliding contact with the teeth on the idler gear and the outer surface of which is in sliding contact with the teeth on the rotor gear. The gears are so designed that a positive driving connection exists between them at a point substantially diametrically opposite the midpoint of the crescent shaped wall. The rotor moves between an inlet and an outlet in an enclosure having spaced sealing lands separating the inlet and outlet. The lands are in sliding contact with the outer surface of the rotor gear teeth. With the construction described lubricant flows by the action of the pump through the inlet into the spaces between the disengaged teeth of the gear member. The lubricant is trapped in the spaces between the teeth on the idler gear and the inner surface of the crescent and the spaces between the teeth on the rotor gear, the outer surface of the crescent and the surface of the sealing land. As the idler gear teeth leave the inner surface of the crescent and the rotor gear teeth leave the sealing surface of the land, the lubricant is expelled into the outlet.

It is essential that these pumps be automatically reversible, that is, irrespective of direction of rotation of the rotor, lubricant flow through the pump must always be in the same direction. This is true because the passages in the equipment to be lubricated are fixed during the fabrication or manufacture thereof.

The necessity for effecting a positive reversal of the idler carrier occurs due to the circumstances surrounding the installation of equipment in the field, of which the pump is a component. For illustration, when a pump of the type under consideration is used on a reciprocating compressor a mechanical connection exists between the crankshaft and the pump rotor. The direction of rotation of the crankshaft is determined by the direction of rotation of the power shaft of the motor employed to drive the compressor. In any three phase wiring system it is usually not practicable to predetermine the direction of rotation of the power shaft of the motor when connections are made between the system and the motor terminals. Accordingly if the pump is constructed so as to positively reverse itself in accordance with the direction of rotation of the crankshaft then proper flow of lubricant from the inlet to the outlet of the pump will be assured.

Pumps of this type are usually provided in a stripped condition and assembled within a cavity in the machine to be lubricated. Among the elements supplied is an end cap within which the idler carrier is journalled and which also is provided with abutments to limit the rotation of the idler carrier. Constructions of this general type have been found to be prone to faulty assembly. Thickness of the sealing gasket is critical, especially in refrigerant compressors where the lubricant is mixed with refrigerant sometimes forming a gaseous mixture. If the gasket is too thick excessive clearance and by-pass may cause the gaseous mixture to fail to prime the pump. If the gasket is too thin jamming may occur either binding the rotor or the idler carrier. In either event the result is the same; that is, an expensive compressor fails because of lack of lubrication.

An object of the present invention is to provide an improved automatically reversible pump that can be easily assembled and tested in the shop and installed as a unit in cartridge form in the field, and in this way obviate the danger of improper field assembly and assure economical, dependable lubrication.

Another object is to provide a pump of greater dependability wherein the automatic reversing action is accomplished in a more positive manner through novel arrangement and construction of parts. This is achieved by journalling the idler carrier to a rotating element, namely the driving rotor. It can be seen that when the idler carrier is not only journalled to but also physically enclosed in the rotor, it will be more strongly inclined to rotate until restrained in its operating position. This reversible feature is based on a sounder basis of operation and, therefore, will provide greater dependability.

The attached drawing illustrates a preferred embodiment of the invention, in which:

Figure 1 is a perspective view of the pump assembly;

Figure 2 is an exploded perspective of the elements of the pump;

Figure 3 is a sectional view along lines I—I in Figure 5 of the pump assembly;

Figure 4 is a sectional view of the pump only along the lines II—II in Figure 3, indicating the inlet and outlet ports and the crescent of the idler carrier in one of its operating positions; and Figure 5 is a sectional view similar to Figure 4 with the crescent of the carrier in the other operating position.

Referring to the drawings there is shown a pump, embodying the invention, for application in a compressor. It will be obvious that the improved pump may be used with other equipment equally as well. The pump is shown in Figure 3 mounted in a cavity in the compressor bearing head 2. Preferably the cavity is in communication with the end bearing of the crankshaft 3. The numeral 4 generally indicates the pump cartridge casing. This casing is of a generally cylindrical shape having at one end a flange mounting indicated at 5 and also a cylindrical cavity 6 within the casing. Extending through the casing walls are two ports, 7, indicating the inlet port, and 8, the outlet port. Mounted into the casing is a lipped bushing 9. In the present embodiment this bushing is force fitted in the casing. Considering Figure 2, the rotor is generally indicated at 10. This rotor consists of a cup portion 11 at one end, a shank portion 12 and a driving tang 13. The cavity in the cup portion 11 is indicated at 14. Gear teeth 15 are formed along the rim of the cup portion. At the bottom of this cavity 14 is found a blind hole 16 providing a bearing surface better seen in Figure 3. The rotor 10 is mounted into bushing 9 and the shank portion 12 is in bearing relationship with the bushing.

An idler gear carrier is generally indicated at 17. It consists of a body portion 18, a bearing shank 19 extending from said body portion and being coaxial therewith. The body is of a generally cylindrical shape and includes a projection portion 20 of a generally crescent shaped configuration. Extending eccentrically from said body is a shaft 21, the end of said shaft having a pin 22 which may be formed as an integral part of said shaft as shown in the drawing. Upon this shaft is mounted an idler gear 23 having a smaller diameter than the pitch circle of the gear teeth on the cup portion of the rotor. This idler gear carrier is journalled in the blind hole 16 provided in the rotor. As can be seen from the drawings the entire idler gear carrier with the exception of the pin 22 is enclosed by the rotor.

Indicated at 24 is a disk member which is force fitted into the bottom of the casing cavity 6. This disk is provided with a slot 25, in the present embodiment, indicated as having a generally curved shape. However, this slot may take an infinite number of shapes in so far as its only duty is to provide stop elements. It can be seen from Figure 3 that the pin 22 on the eccentric shaft 21 is inserted in said slot and acts with the stop elements as a rotation limiting means for the idler gear carrier. In order to seal the flow of lubricant, sealing means are provided, namely a gasket 27 under the flange of the casing and a sealing O-ring 26 located beyond the inlet and outlet ports.

The pump cartridge casing is inserted into a cavity in the compressor bearing head. The inlet and outlet ports of the cartridge are in alignment with similar openings in the bearing head. The gasket under the flange and the O-ring provide sealing means for preventing leakage into the crankcase and outside the compressor. Lubricant on the suction side enters the pump through the inlet port. The lubricant is carried by the disengaged teeth of the rotor and idler gear from the suction to the pressure side of the pump, back flow of the lubricant being prevented by the crescent shaped wall and the sealing lands 28 in the usual manner. Lubricant flows into the outlet port 8 under the action of pump as the teeth on the gears carrying the trapped lubricant are moved into alignment therewith. With the crescent in the position as indicated in Figure 4, should the motor rotation be reversed the crescent will assume the position indicated in Figure 5. This occurs since the pump is directly coupled to the crankshaft through the rotor shank portion, and the crankshaft is connected to the power shaft of the motor.

The movement of the idler gear carrier is accomplished in the following manner. The rotor reverses direction and because of a frictional connection through a lubricant film tends to rotate the idler carrier therewith. Referring to Figure 3, it is again seen that the rotor fully envelopes the carrier and that no significant restraining influences are exerted on the idler carrier. With this construction the idler carrier assumes the rotative nature of the rotor until the pin 22 is restrained by a stop element of slot 25 of disk 24. This occurs when the crescent has reached the position of Figure 5.

Contrast the operation of the proposed construction with the conventional type pumps commonly in use. As pointed out above an end cap is provided to close a cavity in a compressor bearing head. The cavity constitutes a pump well adapted to house the pump components. The end cap in effect partially serves a similar purpose as the cartridge casing in the proposed construction. The end cap further comprises a hollow extension forming in effect a continuation of the cavity. The hollow extension serves as a mounting for the shank portion of the idler carrier and is further provided with stop elements designed to limit rotation of the idler carrier in a manner similar to disk 24. The parts are so constructed that when the idler carrier is assembled within the hollow extension, the crescent shaped projection and the eccentric shaft with the idler gear mounted therein project into the cavity for engagement with the end of the rotor having the gear teeth formed thereon.

Essentially the reversing action in these conventional pumps is effected under the influence of the rotor which is in contact with the idler carrier through the medium of a film of lubricant which is located between the outer surface of the crescent and the inner surface of the rotor gear teeth traversing the outer surface of the crescent. Upon reversal of direction a frictional drag is exerted by the rotor through the lubricant film to the idler carrier and thereby urges the carrier to move with the rotor. It is similarly noted that frictional effects are present between the idler carrier shank and the end cap into which it is journalled. It can, therefore, be seen that two frictional effects are present in conventional pumps. One tends to rotate the idler carrier; the other tends to impede this rotation.

The present invention provides a more positive and dependable means for rotating the idler carrier by utilizing all these frictional forces to effect rotation of the idler carrier.

The present invention provides a more positive and dependable means for rotating the idler carrier. Frictional effects on the idler carrier work to the advantage of the operation and, since they are always present, will tend to insure the reversible operation of the pump. This feature, combined with the cartridge form, clearly present a lubricating pump having a superior theory of operation and a form of greater utility.

While I have described a preferred embodiment of my invention, it will be understood my invention is not limited thereto since it may be otherwise embodied within the scope of the following claims.

I claim:

1. In a pump of the type described comprising a flanged pump cartridge casing including a cavity and an inlet and outlet port extending into the cavity; a bushing mounted in said casing; a rotor rotatably mounted in said bushing; said rotor comprising a cup shaped first end having gear teeth in the rim thereof and a second end extending through said bushing and having attaching means for connecting the rotor to a source of rotative power; an idler gear carrier carried by and supported in said rotor, said idler gear carrier comprising a body with a shaft extending eccentrically therefrom; an idler gear rotatably mounted on the eccentric shaft of the idler gear carrier permitting a limited number of the teeth of the rotor and idler gear to engage; said idler gear carrier further comprising a crescent shaped wall extending between the idler gear and rotor gear teeth; said carrier being in frictional engagement with said rotor to enable the rotor to move the carrier and means adapted to limit the amount of rotation of said idler gear carrier as it moves under the influence of said rotor.

2. A pump of the type described including a casing, closed at one end and open at the other, said casing being provided with a first opening serving as an inlet and a second opening spaced from the first opening serving as an outlet; bearing means, having a passage extending therethrough, serving to substantially close the open end of the casing; a rotor member including a cup shaped portion provided with peripherally spaced gear teeth at one end and a shank portion, the shank portion of said rotor member extending through said passage in the bearing means and projecting beyond the outer surface thereof; an idler gear carrier having a shank portion nested within the shank portion of said rotor member, and a body portion disposed within the cup shaped portion of the rotor member, said carrier further being provided with a crescent shaped projection and an eccentrically mounted stub shaft integrally connected to the body portion thereof; an idler gear rotatably mounted on said stub shaft so as to have limited engagement with the gear teeth formed on the rotor at a point opposite the crescent shaped projection on the idler carrier, the crescent shaped projection being placed between the inlet and the outlet and extending between the idler gear and the rotor to determine the path of fluid from the inlet to the outlet; a protuberance extending axially from the stub shaft beyond the outer limits of the rotor; means positioned adjacent the closed end of the casing for confining movement of the protuberance to a predetermined path, the parts being arranged so that rotational movement applied to the end of the rotor shank projecting beyond the bearing means is transmitted to the idler gear carrier through the corresponding shank portions and the cup shaped portion of the rotor and the body portion of the carrier.

3. In a pump, a pump cartridge casing including a cavity having an inlet opening and an outlet opening, a bushing mounted in said cartridge casing, a rotor carrying gear teeth thereon rotatably mounted in said casing, a rotatable idler gear carrier carried by and rotatably supported in said rotor within said casing, said carrier being in frictional engagement with said rotor to enable the rotor to move the carrier, in idler gear rotatably supported by said carrier eccentrically of the axis of the rotor and operatively engaging the gear teeth of said rotor, said carrier having a wall portion forming a partition within said cartridge cavity placed between the inlet and the outlet and extending between the idler gear and the rotor in such a manner as to form separate inlet and outlet zones in communication with the inlet and outlet openings respectively, and stop means cooperating with the carrier to limit the amount of rotation of said idler carrier as it moves under the influence of said rotor.

4. A pump according to claim 3 in which the idler gear carrier includes first and second shaft portions, said first shaft portion being concentric with the rotor axis, said idler gear being mounted on the second shaft portion.

5. A pump according to claim 4 in which said stop means is provided on the casing to engage the second shaft portion of the idler gear carrier.

6. A pump comprising a casing forming a working chamber and including a first opening in said casing serving as an inlet to said chamber and a second opening in said casing serving as an outlet from said chamber; a rotor carrying gear teeth thereon; an idler gear carrier carried by and rotatably supported in said rotor, said carrier being in frictional engagement with said rotor to enable the rotor to move the carrier; an idler gear rotatably supported by said idler gear carrier eccentrically of the axis of the rotor and operatively engaging the gear teeth of said rotor, said carrier having a wall portion placed between the inlet and the outlet and extending between the idler gear and the rotor to determine the path of fluid from the inlet to the outlet, and stop means cooperating with said carrier to limit the amount of rotation of said idler gear carrier as it moves under the influence of said rotor whereby the ultimate position of the idler gear carrier determines that fluid will pass into the inlet to the chamber and be discharged from the outlet from the chamber regardless of the direction of rotation of the rotor.

7. A pump according to claim 6 in which said rotor is provided with a cavity, the walls thereof being adapted to enclose the idler gear carrier.

8. A pump comprising a casing forming a working chamber and including a first opening in said casing serving as an inlet to said chamber and a second opening in said casing serving as an outlet from said chamber; bearing means in said chamber; a rotor having a cup shaped portion, said rotor being rotatably supported in said bearing means and being provided with gear teeth about one end thereof; an idler gear carrier carried by and supported in said rotor, said carrier being in frictional engagement with said rotor to enable the rotor to move the carrier, said idler gear carrier having an eccentric shaft portion; an idler gear rotatably mounted on said eccentric shaft and operatively engaging said gear teeth; said idler gear and said idler gear carrier being enveloped by the cup shaped portion of the rotor; said carrier having a wall portion placed between the inlet and the outlet and extending between the idler gear and the rotor to determine the path of fluid from the inlet to the outlet; and stop means cooperating with the carrier to limit the amount of rotation of said idler gear carrier as it moves under the influence of said rotor whereby the ultimate position of the idler gear carrier determines that fluid will pass to the inlet of the chamber and be discharged from the outlet from the chamber regardless of the direction of rotation of the rotor.

9. A pump according to claim 8 in which said wall portion is formed in the shape of a crescent.

References Cited in the file of this patent

UNITED STATES PATENTS

| 1,700,818 | Wilsey | Feb. 5, 1929 |
| 2,225,228 | Neeson | Dec. 17, 1940 |

FOREIGN PATENTS

| 218,968 | Switzerland | May 1, 1942 |
| 918,140 | France | Oct. 7, 1946 |